United States Patent
Lamb et al.

(10) Patent No.: US 11,301,215 B2
(45) Date of Patent: Apr. 12, 2022

(54) REAL TIME CONFIGURATION OF MULTIPLE TRUE RANDOM NUMBER GENERATOR SOURCES FOR OPTIMIZED ENTROPY GENERATION

(71) Applicant: INTERNATIONAL BUSINESS MACHINES CORPORATION, Armonk, NY (US)

(72) Inventors: Kirk David Lamb, Poughkeepsie, NY (US); Nihad Hadzic, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 16/773,861

(22) Filed: Jan. 27, 2020

(65) Prior Publication Data

US 2021/0232367 A1    Jul. 29, 2021

(51) Int. Cl.
   *G06F 7/58*       (2006.01)
   *G06K 9/62*       (2006.01)
   *G06F 7/505*      (2006.01)

(52) U.S. Cl.
   CPC ............ *G06F 7/588* (2013.01); *G06F 7/5057* (2013.01); *G06K 9/6231* (2013.01)

(58) Field of Classification Search
   CPC .......... G06F 7/58; G06F 7/588; G06F 7/5057; G06K 9/6231

(Continued)

(56) References Cited

U.S. PATENT DOCUMENTS 9,058,228 B2    6/2015    Sackett
9,569,176 B2    2/2017    Venkata
(Continued)

FOREIGN PATENT DOCUMENTS

EP          2600561 A1    6/2013

OTHER PUBLICATIONS

S.K. Satpathy et al., An All-Digital Unified Physically Unclonable Function and True Random Number Generator Featuring Self-Calibrating Heirarchical Von Neumann Extraction in 14-nm Trigate CMOS, IEEE Journal of Solid-State Circuits, vol. 54, No. 4, 2019 (Year: 2019).*

(Continued)

*Primary Examiner* — Emily E Larocque
(74) *Attorney, Agent, or Firm* — Cantor Colburn LLP; Margaret McNamara

(57) ABSTRACT

A computer-implemented method for generating one or more random numbers includes configuring a mapper to feed inputs of a random number generation system using a subset of noise sources from multiple noise sources. The random number generation system generates a random number based on the inputs. The method further includes evaluating the subset of noise sources and detecting that a first noise source from the subset of noise sources has degraded in quality. The method further includes evaluating a second noise source from the available noise sources, the second noise source not being in the subset of noise sources. In response to the second noise source satisfying a predetermined threshold criterion, the first noise source is replaced with the second in the subset of noise sources for providing random bit streams to facilitate generating the random number by the random number generation system.

18 Claims, 6 Drawing Sheets

(58) Field of Classification Search
USPC .................................................. 708/250, 255
See application file for complete search history.

(56) References Cited

U.S. PATENT DOCUMENTS

| | | |
|---|---|---|
| 9,846,568 B2 | 12/2017 | Hamilton |
| 9,959,096 B2 | 5/2018 | Hoppener |
| 10,333,708 B1 | 6/2019 | Diamant |
| 10,402,172 B1* | 9/2019 | Mandich ................. G06F 7/588 |
| 2016/0062735 A1 | 3/2016 | Wilbur |
| 2018/0293052 A1 | 10/2018 | Suresh |
| 2018/0300108 A1* | 10/2018 | Goldman ................ H04L 67/10 |
| 2019/0050202 A1 | 2/2019 | Dale |
| 2019/0058578 A1 | 2/2019 | Johnston |
| 2019/0068190 A1* | 2/2019 | Karpinskyy .......... H04L 9/0866 |
| 2019/0377553 A1* | 12/2019 | Maynard ................. G06F 7/588 |

OTHER PUBLICATIONS

S. Hussain et al., A Built-in-Self-Test Scheme for Online Evaluation of Physical Unclonable Functions and True Random Number Generators, IEEE Transactions on Multi-Scale Computing System, vol. 2, No. 1, 2016 (Year: 2016).*

Michaelis et al., "Randomly Failed! The State of Randomness in Current Java Implementations", Topics in Cryptology—CT-RSA 2013. Lecture Notes in Computer Science, vol. 7779, pp. 129-144. Springer, Berlin, Heidelberg. Published 2013.

Varchola, "FPGA Based True Random Number Generators for Embedded Cryptographic Applications", Cryptographic Engineering Research Group (CERG), 2009. 91 pages.

Transmittal Form PTO/SB/21, filed Mar. 18, 2020.

* cited by examiner

| RNG Inputs | Mapper inputs | next customer input update | next entropy source candidate = mux_ctl_a | Noise Source outputs | Noise Source Pass/fail |
|---|---|---|---|---|---|
| 0 | 2 | 0 | 6 | 0 | 0 |
| 1 | 3 | | | 1 | 1 |
| 2 | 4 | | | 2 | 1 |
| 3 | 5 | | | 3 | 1 |
| | | | | 4 | 1 |
| | | | | 5 | 1 |
| | | | | 6 | 1 |
| | | | | 7 | 1 |

410

| | | | | | |
|---|---|---|---|---|---|
| 0 | 2 | 0 | 7 | 0 | 0 |
| 1 | 3 | | | 1 | 1 |
| 2 | 4 | | | 2 | 1 |
| 3 | 5 | | | 3 | 1 |
| | | | | 4 | 1 |
| | | | | 5 | 1 |
| | | | | 6 | 0 |
| | | | | 7 | 1 |

420

| | | | | | |
|---|---|---|---|---|---|
| 0 | 7 | 1 | 0 | 0 | 0 |
| 1 | 3 | | | 1 | 1 |
| 2 | 4 | | | 2 | 1 |
| 3 | 5 | | | 3 | 1 |
| | | | | 4 | 1 |
| | | | | 5 | 1 |
| | | | | 6 | 0 |
| | | | | 7 | 1 |

REAL TIME CONFIGURATION OF MULTIPLE TRUE RANDOM NUMBER GENERATOR SOURCES FOR OPTIMIZED ENTROPY GENERATION

BACKGROUND

The present invention relates generally to computing technology, and particularly to improving entropy quality of random number generation by configuring multiple random number generator sources.

A sequence of random numbers is useful in many areas of science, research, mathematics and manufacturing, such as simulation, cryptography, medical research, statistical process control, and gaming, to name just a few. Accordingly, various computer applications are dependent on the ability to generate unpredictable random numbers. Hence, some computing devices provide access to a random number generator (RNG), sometimes called a random bit generator (RBG). There are two classes of RNG: (1) a true random number generator (TRNG), sometimes called a non-deterministic random number generator (NDRNG); and (2) a pseudo-random number generator (PRNG), sometimes called the deterministic random number generator (DRNG).

SUMMARY

According to one or more embodiments of the present invention, a computer-implemented method for generating one or more random numbers includes configuring, by a controller, a mapper to feed inputs of a random number generation system using a subset of noise sources from a pool of noise sources. The random number generation system generates a random number based on the inputs. The method further includes evaluating, by the controller, the subset of noise sources. The method further includes detecting, by the controller, that a first noise source from the subset of noise sources has degraded in quality. The method further includes evaluating, by the controller, a second noise source from the pool of noise sources, the second noise source not being in the subset of noise sources. The method further includes, in response to the second noise source satisfying at least a predetermined threshold criterion, replacing, by the controller, the first noise source with the second noise source in the subset of noise sources. The method further includes forwarding, by the mapper, outputs from each of the subset of noise sources to corresponding inputs of the random number generation system, the outputs providing random bit streams to facilitate generating the random number by the random number generation system.

According to one or more embodiments of the present invention, a system for random number generation includes a multiplexer, a memory device, and at least one processing unit coupled with the multiplexer and the memory device. The processing unit(s) perform a method that includes configuring a mapper to feed inputs of a random number generation system using a subset of noise sources from a pool of noise sources. The random number generation system generates a random number based on the inputs. The method further includes evaluating the subset of noise sources. The method further includes detecting that a first noise source from the subset of noise sources has degraded in quality. The method further includes evaluating a second noise source from the pool of noise sources, the second noise source not being in the subset of noise sources. The method further includes, in response to the second noise source satisfying at least a predetermined threshold criterion, replacing the first noise source with the second noise source in the subset of noise sources. The method further includes forwarding, by the mapper, outputs from each of the subset of noise sources to corresponding inputs of the random number generation system, the outputs providing random bit streams to facilitate generating the random number by the random number generation system.

According to one or more embodiments of the present invention, a computer program product for generating random numbers includes a storage medium readable by one or more processing circuits. The storage medium stores instructions that are executable by the one or more processing circuits to cause a method to be performed. The method includes configuring a mapper to feed inputs of a random number generation system using a subset of noise sources from a pool of noise sources. The random number generation system generates a random number based on the inputs. The method further includes evaluating the subset of noise sources. The method further includes detecting that a first noise source from the subset of noise sources has degraded in quality. The method further includes evaluating a second noise source from the pool of noise sources, the second noise source not being in the subset of noise sources. The method further includes, in response to the second noise source satisfying at least a predetermined threshold criterion, replacing the first noise source with the second noise source in the subset of noise sources. The method further includes forwarding, by the mapper, outputs from each of the subset of noise sources to corresponding inputs of the random number generation system, the outputs providing random bit streams to facilitate generating the random number by the random number generation system.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

FIG. 4 depicts an example scenario depicting selection of noise sources for generating random number(s) according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

One or more embodiments of the present invention facilitate optimization of random number generation by configuring multiple entropy generation sources in a system. Typically, a system, such as a computing device, can include a true random number generator (TRNG) that can be accessed by one or more applications/devices of the system. The TRNG extracts entropy from one or more noise sources (or entropy sources) in the system and compresses the entropy into a stream of random bytes. For hardware-based TRNG modules, the noise sources are one or more hardware components from the device. For example, a resistor in the device can be used as a noise source, where result of sampling a thermal noise from the resistor is used as the noise (entropy) for generating random numbers. As examples, true random number generators may be based on quantum effects of radioactive isotope decay, atmospheric radio noise, interference of ring oscillators, etc.

Typically, to generate a random bit stream, the system combines, for example, using a logical operation like XOR, several streams of random bits from respective noise sources to achieve a resulting random bit stream with an entropy quality that is higher than any of the individual bit streams. A technical challenge for a system is to evaluate the quality of each individual noise source that provides the random bit streams, and to choose those bit streams that have at least an acceptable threshold quality, which can be provided by a user. Such selected bit streams are combined (e.g., XORed) together to create the final resulting random bit stream. Embodiments of the present invention address such technical challenges and facilitate selecting a combination of bit streams based on an assessment of the noise (entropy) sources that are available to the system.

Figure 1:
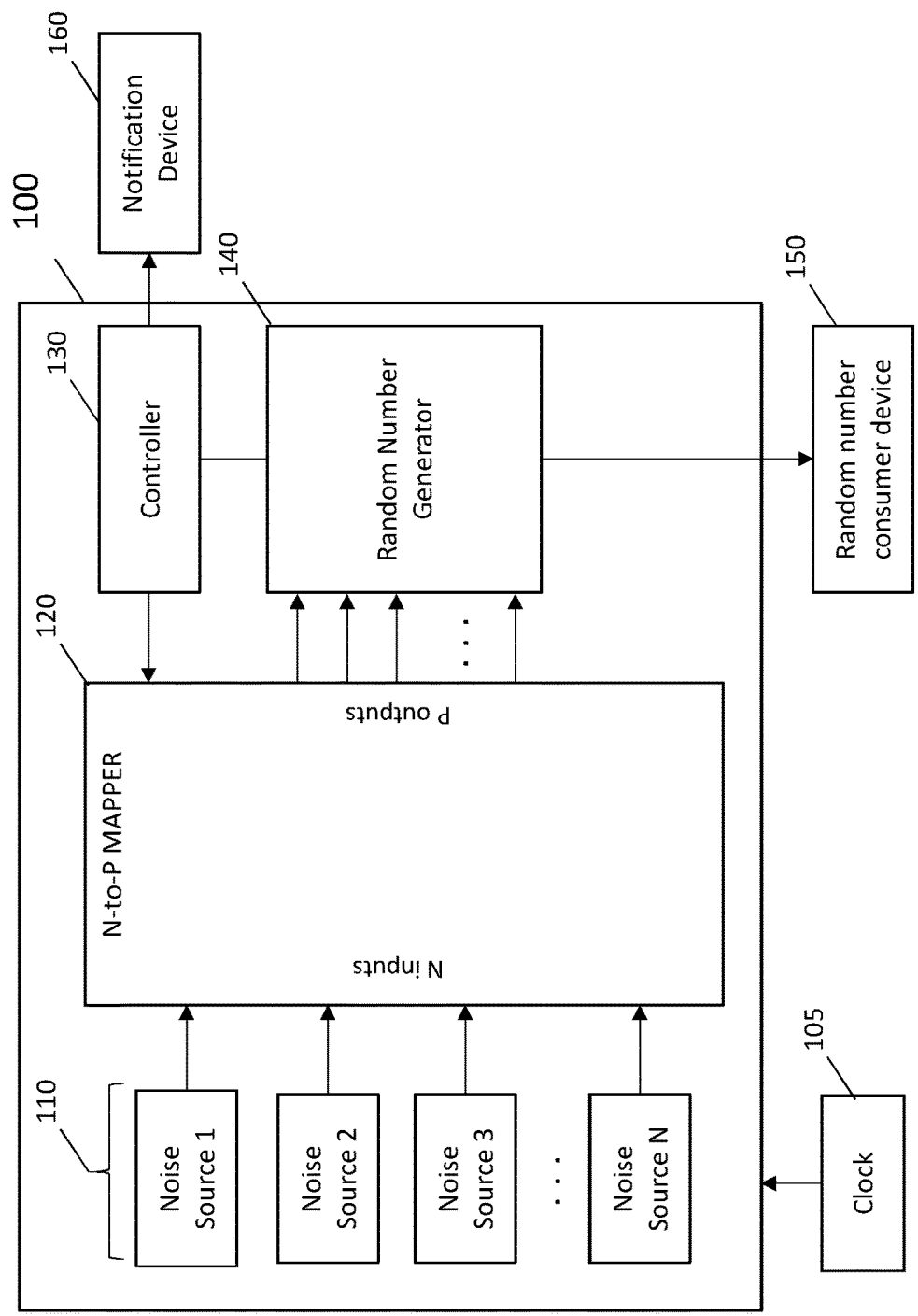
FIG. 1 illustrates a block diagram of an example random number generation system in accordance with one or more embodiments described herein.

FIG. 1 depicts a block diagram of a random number generation system according to one or more embodiments of the present invention. The depicted system 100 includes multiple noise sources 110, a mapper 120, a controller 130, a random number generator 140. The system 100 provides one or more random numbers to a consumer device 150. Alternatively, or in addition, the system 100 provides notifications, for example to a user, via a notification device 160.

The system can have N noise sources 110, labeled 1 through N in FIG. 1, where N can vary per system. In one or more embodiments of the present invention, the noise sources 110 can be various operational devices and can include programs, applications, OS subroutines, etc. that generate entropy values. Alternatively, or in addition, the noise sources 110 can include hardware components, such as specially configured circuits that generate statistically random noise signals based on various effects such as thermal noise, the photoelectric effect or other quantum phenomena, timing of certain events, etc. For example, a counter and timing system can be used to aggregate entropy values based on system events (e.g., keystrokes, system calls, etc.). in yet another example, the noise sources can include a ring oscillator, or a multiple ring oscillator sampler. Various other examples of noise sources that are not listed herein can be used in other embodiments of the present invention. It should be noted that in one or more embodiments of the present invention, the noise sources 110 can include a combination of various types of noise sources. In one or more embodiments of the present invention, the noise sources 110 generate a random bit string at a particular frequency that is based on a clock 105. For example, at a predetermined clock-cycle, the clock 105 sends an 'enable' signal to one or more of the noise sources 110 to generate a respective random bit stream.

The mapper 120 is coupled with the noise sources 110 so that the mapper 120 can receive N inputs, one from each of the noise sources 110. Each of the N inputs is a random bit stream from the respective noise source 110. The mapper 120 maps the N input streams to P output random bit streams, where N≥P, and where the P output random bit streams are provided to a random number generator 140 in one or more examples. Alternatively, or in addition, the P outputs can be provided to any other device/component that uses multiple random bit streams.

The random number generator 140 can use the P random bit streams for generating one or more random numbers. The random number(s) can be provided to the consumer device 150, which can use the random number(s) for functions such as simulation, cryptography, medical research, statistical process control, and gaming, to name just a few.

The controller 130 continuously monitors and evaluates a quality of each of the noise sources 110, and particularly the quality of the random bit stream that is generated by the noise sources 110. In one or more embodiments of the present invention, the quality of a noise source 110 can depend on process-voltage-temperature (PVT) of the noise source 110. As such, the quality can be characterized by the PVT parameters. in one or more embodiments of the present invention, the controller 130 continuously evaluate the noise sources 110 to ensure that the random bit streams being used by the random number generator 140 meet one or more predetermined quality criteria.

In one or more embodiments of the present invention, in the event that one or more of the random bit streams do not meet the criteria, the controller 130 swaps in a new noise source of recently evaluated bit stream to replace the previously evaluated noise source. Alternatively, or in addition, if replacement with a new source also does not satisfy the predetermined criteria, the controller 130 uses the notification device 160 to notify a user that the random number generation quality does not meet the specified threshold. In one or more examples, the user configures the threshold that is to be used. In one or more examples, the user, upon receiving the notification, can change the threshold. Alternatively, or in addition, the user can change the random number generation technique being used by the random number generator 140.

For example, the random number generator 140 can be a deterministic random number generator (DRNG) that operates using a predetermined algorithm to generate a random number based on the input bit stream(s). The algorithm can be changed based on the quality of the random numbers being generated, in one or more embodiments of the present invention.

Figure 2:
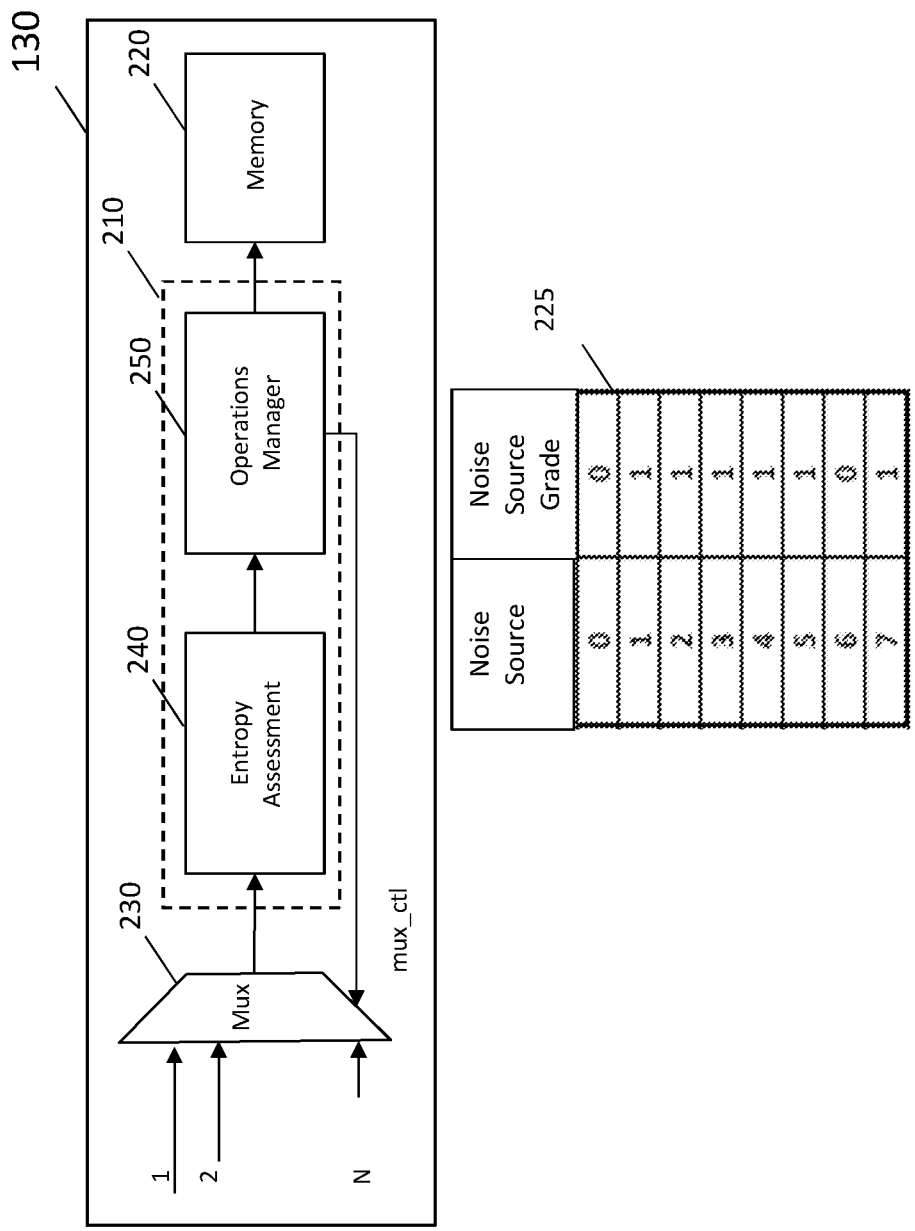
FIG. 2 depicts a controller to manage random number generation according to one or more embodiments of the present invention.

FIG. 2 depicts a block diagram of a controller according to one or more embodiments of the present invention. The depiction is one possible structure of the controller 130. It is understood that in one or more embodiments of the present invention the structure can be modified. The controller 130 includes one or more processing units 210, and one or more memory devices 220. In one or more embodiments of the present invention, the controller 130 includes a multiplexer 230 for selection of particular inputs to be evaluated. While the multiplexer 230 facilitates an efficient use of the entropy assessment resources of the controller, in one or more embodiments of the present invention, each input stream can be connected directly to the one or more processing units for evaluation. In one or more examples, the processing units 210 evaluates the noise sources 110 using an entropy assessment module 240. Further, the processing units includes an operations manager module 250 that controls the processing of the random number generator 130 by bookkeeping the results of the assessment of the noise sources 110.

In one or more embodiments of the present invention, the processing units 210 operate based on one or more computer executable instructions that are stored in the memory devices 220. The memory devices 220 can further include memory devices and/or locations that are used as a scratchpad during execution of the instructions. Alternatively, or in addition, the processing units 210 include hardware units, such as field programmable array (FPGA), integrated circuits (IC), such as application specific ICs (ASICs), or other types of digital and/or analog circuitry. In one or more embodiments of the present invention, the memory devices 220 store a look-up table 225 that identifies a grade for each noise source 110. In one or more embodiments of the present invention, the look-up table 225 has grades only for the noise sources 110 that are being used by the mapper 120, for example, the P noise sources 110 that are used to provide random bit streams to the random number generator 140. Further, the operations manager 250 keeps a record of the noise sources 110 that are being used, those that have never been used, as well as those noise sources that have failed (and are no longer being used). Such information can be stored in the look-up table 225 in one or more embodiments of the present invention. Alternatively, the operations manager 250 stores such information in another data structure, such as a table, in the memory devices 220.

The multiplexer 230 facilitates the processing units 210 to select one of the noise sources 110 to be assessed. For example, the processing units send a control signal to the multiplexer 230 for the selection of one or more from the N noise sources 110. In response, the multiplexer 230 forwards the random bit stream from the selected noise source 110 for the entropy assessment 240. The result from the entropy assessment 240 is forwarded to the operations manager 250 for bookkeeping and data control.

Figure 3A:
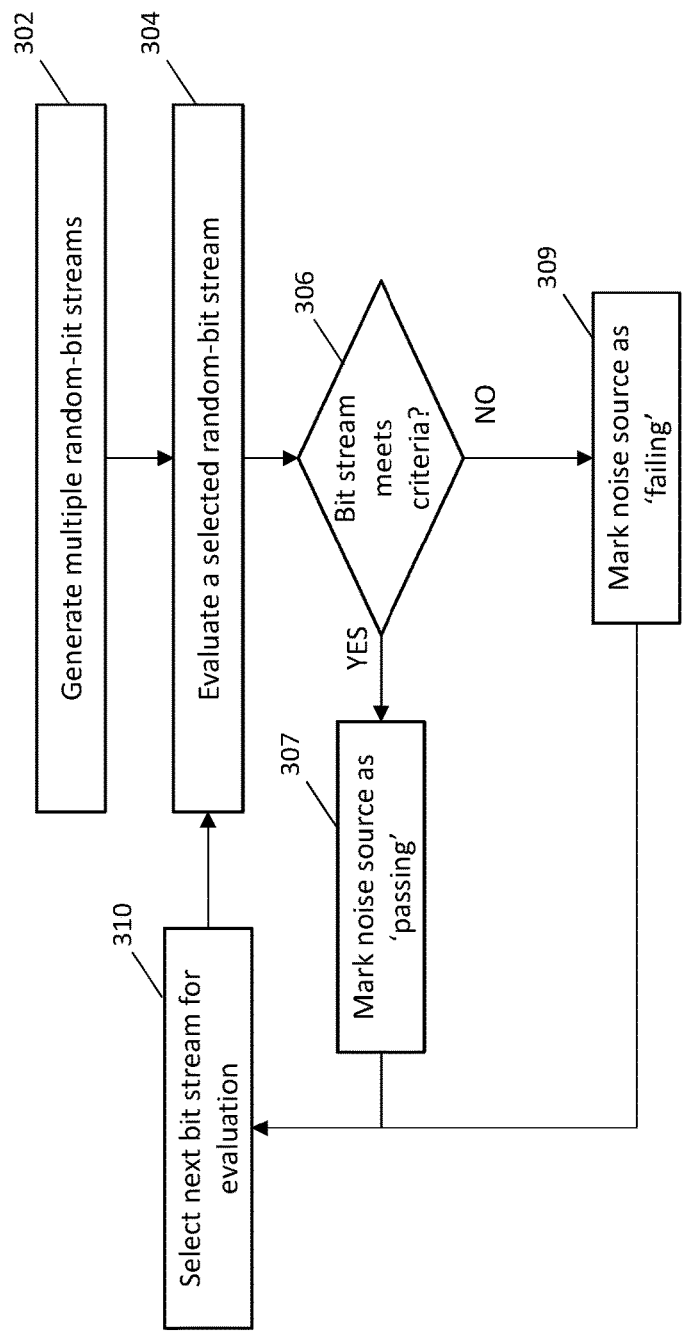
FIG. 3A depicts a flowchart of a method for evaluating noise sources for generating random number(s) according to one or more embodiments of the present invention.

FIG. 3A depicts a flowchart of an example method 300 for random number generation according to one or more embodiments of the present invention. In one or more embodiments of the present invention, the operations depicted by the flowchart can be performed in an order that is different from the sequence of operations depicted. Alternatively, or in addition, one or more of the operations can be performed in parallel in one or more embodiments of the present invention. The depicted method 300 includes generating multiple random bit streams from the set of noise sources 110, at block 302. In one or more examples, a clock signal from the clock 105 is sent to the noise sources 110 to generate the random bit streams. In one or more examples, the random bit streams are generated in parallel by the noise sources 110. In some examples, the random bit streams are generated sequentially.

The method further includes evaluating the random bit streams, at block 304. In one or more embodiments of the present invention, the entropy assessment 240 receives each of the random bit streams as input. In one or more examples, the operations manager 250 sends a multiplexer control signal to the multiplexer 230 to select which one of the multiple random bit streams to input for the entropy assessment 240.

The entropy assessment 240 evaluates the received bit stream and produces a pass/fail output. Alternatively, or in addition, the entropy assessment 240 produces an entropy quality grade for each bit stream. In yet another example, the entropy assessment 240 produces multiple entropy quality grades for each bit stream.

The entropy assessment 240 determines, based on the evaluation, whether a random bit stream meets a predetermined threshold criterion, at block 306. In one or more examples, the threshold criterion is configured by a user. The entropy assessment 240 can apply multiple criteria to evaluate the bit streams.

For example, the entropy assessment 240 executes a suite of statistical analysis tests over the raw data in the random bit stream. In one or more embodiments of the present invention, the tests are performed on particular portions of the bit stream and the results of each portion are concatenated. For example, consider that the bit stream includes "m" bits that are divided into "n" groups where each of the "n" groups (bit stream) has 1,000,000 (1 million) bits. Various tests are conducted over each of these group. For example: "m"=10 million bits, then group n=10 where each group has 1 million bits. Accordingly, in the result file one would see total 10 test cases per statistical test.

The statistical tests can include a frequency test for number of '1' and '0' in a sequence. The statistical tests can also include a frequency test within a block of bits. The test checks the proportion of '1' (or 0s) in M bit blocks with a predetermined ratio, for example, M/2. Further, the statistical tests can check runs of particular patterns, i.e., tests for identical bit length in a sequence. The statistical tests can also include testing longest runs of ones, i.e., length of bit '1' in a sequence.

In one or more embodiments of the present invention, the statistical tests can include a binary matrix rank test. The purpose of this test is to check for linear dependence among fixed length sub strings of the original sequence, which is tested through the rank of disjoint sub-matrices of the entire sequence. Alternatively, or in addition, the statistical tests include a Discrete Fourier Transform (DFT) test. The purpose of this test is to detect periodic features (i.e., repetitive patterns that are near each other) in the tested sequence that would indicate a deviation from the assumption of randomness which is tested through DFT of the sequence of bits.

Further yet, in one or more embodiments of the present invention, the statistical tests include a non-overlapping template matching test. This checks the number of occurrences of pre-specified target strings. The purpose of this test is to detect generators that produce too many occurrences of a given non-periodic (aperiodic) pattern. If the pattern is not found, the window slides one bit position. If the pattern is found, the window is reset to the bit after the found pattern, and the search resumes. Alternatively, or in addition, the statistical tests include an overlapping template matching test, which also checks the number of occurrences of pre-specified target strings. The difference between this test and the non-overlapping template matching test is that, in this case, when the pattern is found, the window slides only one bit before resuming the search.

The statistical tests can include several other tests such as Maurer's "Universal Statistical" Test that checks the number of bits between matching patterns. A linear complexity test determines if the sequence is complex enough to be considered random by testing the length of a linear feedback shift register (LFSR). Further, a serial test determines whether the number of occurrences of the 2 mm-bit overlapping patterns is approximately the same as would be expected for a random sequence. An approximate entropy test includes comparing the frequency of overlapping blocks of two consecutive/adjacent lengths (m and m+1) against an expected result for a random sequence. A cumulative sum test determines whether the cumulative sum of the partial sequences occurring in the tested sequence is too large or too small relative to the expected behavior of that cumulative sum for random sequences. In random excursion test it is determined if the number of visits to a state within a cycle deviates from what one would expect for a random sequence. A random excursion variant test includes detecting deviations from the expected number of visits to various states in the random walk.

It is understood that the list of tests described herein can be used in various combinations and that additional tests can also be included to evaluate the bit streams. The particular test(s) that is/are used for the evaluation do not affect one or more embodiments of the present invention. Each test that is executed can provide a grade to the bit stream that is being evaluated. In one or more embodiments of the present invention, the grades are combined into a single grade, for example, by averaging, weighted averaging, or other combining techniques. In one or more embodiments of the present invention, the grade is binary-pass/fail.

Referring back to the flowchart of FIG. 3A, if the bit stream satisfies the threshold criterion (at block 306) that is set for the quality of the bit stream, i.e., if grade(s) exceed threshold criterion grade(s), the method 300 includes marking the noise source 110 being evaluated as 'passing', at block 307. Alternatively, if the bit stream does not satisfy the threshold criterion (at block 306), the noise source 110 is marked as 'failing', at block 309. For example, the PVT parameters of a first noise source 110, for example, an ROS, can change resulting in the random bit stream generated by the first noise source 110 to fail the threshold criterion. The PVT parameters can change because of various reasons, such as overuse, malfunction, etc. In such a case, an entry in the look-up table 225 for the first noise source 110 will be marked as 'failing' (e.g., 0).

The look-up table 225 is updated with the result of the evaluation. In one or more embodiments of the present invention, the passing grade can be represented by a '1' and the failing grade can be represented by a '0'. It is understood that other representations of the grades can be used in other embodiments of the present invention.

The method 300 to evaluate the random bit streams proceeds continuously. The operations manager 250 selects one of the bit streams from the noise sources 110 for assessment, at block 310. Accordingly, the entropy assessment 240 continuously updates the look-up table 225, which can be queried for quality status of the pool of noise sources 110. For example, the operations manager 250 can use the look-up table 225 to update the mapping configuration of the mapper 120.

Figure 3B:
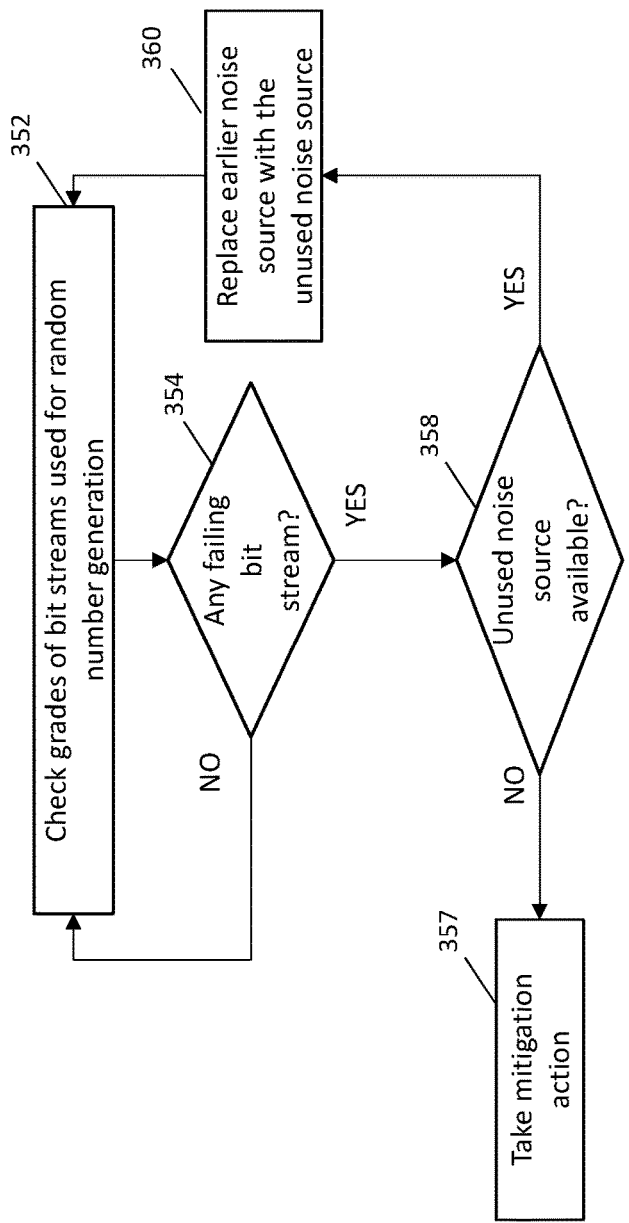
FIG. 3B depicts a flowchart of a method for generating random number(s) according to one or more embodiments of the present invention.

FIG. 3B depicts a flowchart of an example method 350 for random number generation according to one or more embodiments of the present invention. The method 350 includes checking, by the operations manager 250, that the noise sources 110 that are mapped to the P outputs of the mapper 120, i.e., are being used to provide random bit streams to the random number generator 140, are 'passing', at block 352. The operations manager 250 checks the look-up table 225 for the grades of the bit streams. In one or more embodiments of the present invention, as long as the noise sources 110 in use are passing, bit streams from those noise sources 110 are continued to be sent for random number generation (as shown in FIG. 3A).

If any of the noise sources 110, say a first noise source 110 has a failing grade, the operations manager 250 determines if there are any noise sources 110 in the system 100 that have not been used yet, at block 358. Because the mapper 120 selects P random bit streams from the N noise sources 110 that are available to the system 100, the operations manager 250 checks if any of the remaining N-P noise sources can be used instead of the first noise source 110 that has failed.

As noted earlier, the operations manager 250 keeps a record of the noise sources 110 that are being used as well as those that have failed the criteria. The operations manager 250 also has a record of all the noise sources 110 available to the system 100. Accordingly, the operations manager 250 identifies and selects a next unused noise source. The operations manager replaces the first noise source 110 (that failed) with this second (unused) noise source, at block 360. In one or more embodiments of the present invention, the operations manager initiates and evaluates a random bit stream from the second noise source 110. In one or more embodiments of the present invention, the operations manager 250 sends an initiation signal, such as a CLK to the second noise source 110. The operations manager 250 also selects that bit stream, via the multiplexer 230, to be evaluated by the entropy assessment 240, as described herein earlier. The grade of the second noise source 110 is checked, at block 354.

If at least P noise sources 110 are not available, the operations manager 250 takes a mitigation action, at block 357. The mitigation action can include sending a notification to the user. Alternatively, or in addition, the mitigation action can include suspending the operation of the random number generator 140. Alternatively, or in addition, in one or more embodiments of the present invention, the user can cause the operations manager 250 to adjust processing algorithms of the random number generator 140 based on the entropy quality of the available noise sources 110. Alternatively, or in addition, the user can cause the operations manager 250 to adjust the threshold criterion for selection of the noise sources 110.

For example, suppose the random bit streams are evaluated by criteria x1, x2, and x3, where x3 is the highest quality. If at least P noise sources that satisfy x3 are not available, and if the quality drops to x2, the user can cause the random number generator 140 to execute one or more processing algorithms that enhance the quality of the bit streams. In one or more embodiments of the present invention, the processing units 210 can notify the random number generator 140 to execute the algorithms. In this manner, the processed bit streams meet x3 quality requirements, but by applying a more expensive processing algorithm. In comparison, if P bit streams that meet the x3 criterion are available, the random number generator 140 does not have to execute the expensive algorithms.

In one or more embodiments of the present invention, the methods 300 and 350 can be executed in parallel and in a continuous manner. Alternatively, in one or more embodiments of the present invention, the methods 300 and 350 are executed sequentially, in a continuous manner.

Accordingly, one or more embodiments of the present invention facilitate generating one or more random numbers using noise sources that satisfy a threshold criterion. Further, one or more embodiments of the present invention facilitate continuously monitoring the quality of the noise sources and selecting the noise sources that satisfy the threshold criterion. In the event that the quality of a noise source drops below the threshold criterion, a replacement noise source is identified and selected. It should be noted that the noise sources that are not being used can be maintained in a suspended state. Accordingly, the life of the noise sources is potentially lengthened because only minimum required noise sources are enabled at any one time, with those noise sources that are not being used, placed in a suspended state. An example cause for reduction in life expectancy of a noise source is electro-migration (EMIG) on a ROS. Electro-migration is the transport of material caused by the gradual movement of the ions in a conductor due to the momentum transfer between conducting electrons and diffusing metal atoms. The effect is important in applications where high direct current densities are used, such as in microelectronics and related structures.

FIG. 4 depicts an example scenario of selecting noise sources in operation according to one or more embodiments of the present invention. For this example, let N=8, P=4, and consider that the system 100 is initialized, has been running, and configured so that the mapper 120 feeds random bit streams from noise sources 2:5 to consumer inputs 0:3. Further consider that the controller works round robin to select a new noise source 110, and replaces old ones from top down. In other examples, any other algorithm can be used for such selection and replacement. Accordingly, in this example, the next candidate noise source is source 6. Further, consider that the input-0 of the random number generator 140 is to the be swapped. This information is shown in table 410.

The operations manager 250 uses the multiplexer 230 to select the random bit stream from the noise source 6, and the entropy assessment 240 evaluates it and gives it a pass/fail grade. Suppose that the noise source fails, the operations manager 250 updates the record for the noise source 6, and the next candidate noise source 7 is selected as a replacement. This information is shown in table 420. In one or more embodiments of the present invention, if a noise source that was previously "good" is assessed as "bad," a suspend signal to the random number generator 140 can be raised, and not lowered until all inputs to the random number generator 140 have been re-evaluated.

Further along, suppose that the noise source 7 passes. The operations manager 250 updates the mapper 120, and noise source 7 now feeds the input 0 of the random number generator 140 (instead of the noise source 2). The noise source 2, which was previously feeding the input 0, is suspended in one or more embodiments of the present invention. This information is shown in the state table 430.

These operations, as shown in the method 300 and in the method 350, continue as long as the system 100 is operative. The methods 300 and 350 are executed using the clock 105 operating at a predetermined frequency in one or more embodiments of the present invention. The operations manager 250 and entropy assessment module 240 continuously update the records in the look-up table 225, which can be queried for quality status of the pool of noise sources 110 in one or more embodiments of the present invention.

Embodiments of the present invention facilitate dynamic enabling of individual noise sources in a random number generation system. The noise sources can also be referred to as entropy sources or entropy suppliers. Such dynamic enabling (and disabling) of the noise sources can facilitate lengthening product life of the random number generation system because only minimum required entropy sources are enabled at any one time. Those not being used can be suspended. An example would be EMIG on a ROS. Further, the technical features described herein improve PVT variation tolerance of the random number generation system. Some entropy sources may produce higher quality than others at various PVT. Because the pool of entropy sources is always being evaluated and the best sources enabled, the random number generation system can provide a consistent output regardless of PVT.

Further, in one or more embodiments of the present invention, the random number generation system facilitates hardware control of entropy selection and hence improves security of the technical features provided. In one or more embodiments of the present invention, the entropy quality checks are performed within a secure boundary if the random number generation system is within a hardware security module (HSM).

In one or more embodiments of the present invention, the technical features of the random number generation system can be used as precision hardware characterization tool for qualifying hardware.

Further, in one or more embodiments of the present invention, the technical features of the random number generation system can circumvent the requirement of existing systems to post process random bit streams that are used for generating the random numbers.

The random number generation system mitigates the effect of the quality of one or more entropy sources being degraded. For example, if insufficient quality entropy supply is available, random number operations can be suspended by the controller. Further, in one or more embodiments of the present invention, if the pool of entropy sources is sufficient but below a defined limit, the controller can also notify the random number generation system for preventive action.

Further yet, in one or more embodiments of the present invention, the mitigation facilitates fault (degradation) tolerance. For example, a user can adjust processing algorithms of the random number generator based on the entropy quality of entropy sources that are available.

In one or more embodiments of the present invention, the entropy quality can vary (meet different evaluation criteria) over time, but the random number generation system can keep producing a valid output by selecting the right entropy sources.

In one or more embodiments of the present invention, the random number generation systems can be cascaded, i.e., a first random number generation system provides an input to a second random number generation system.

Figure 5:
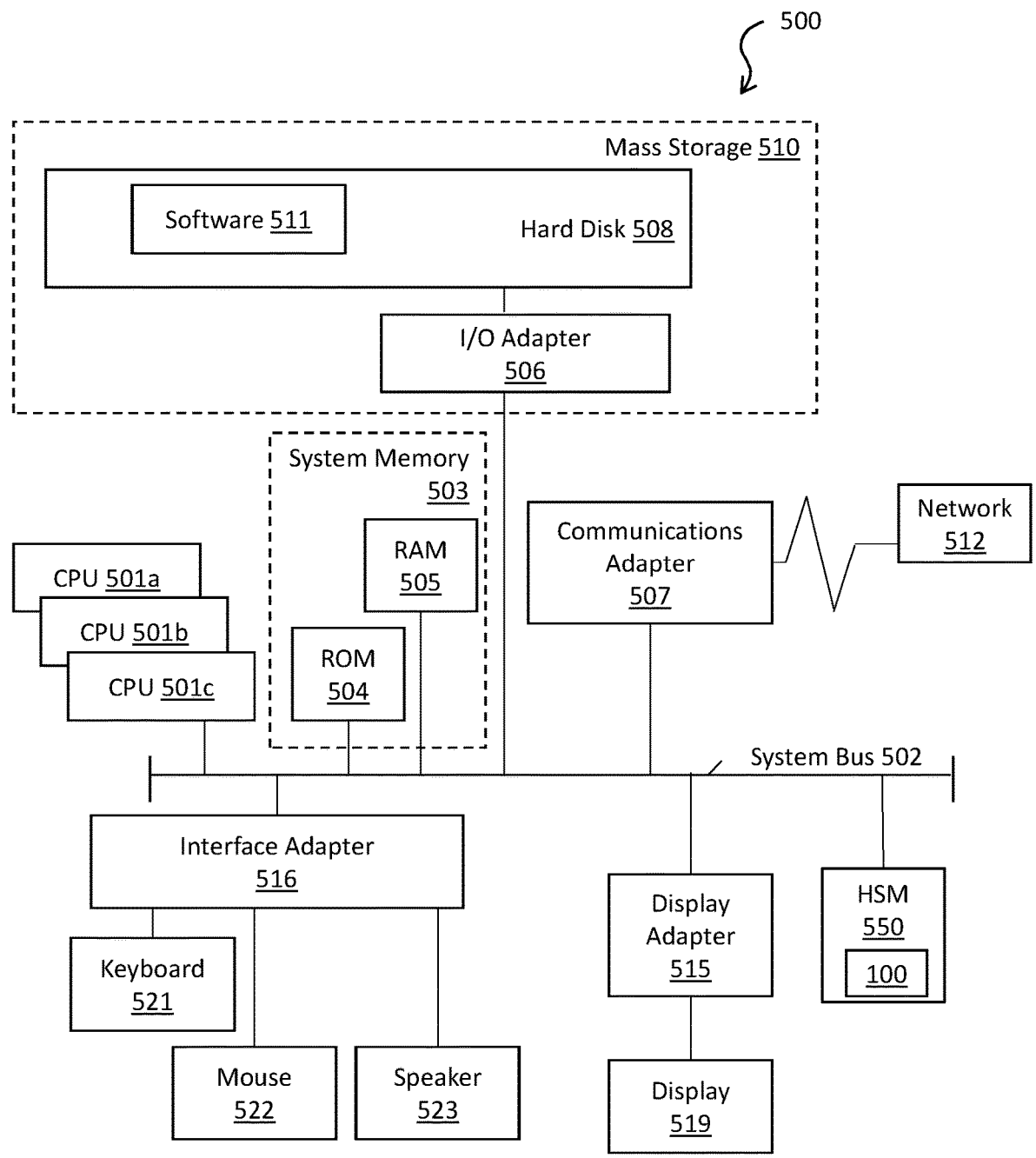
FIG. 5 depicts a computer system that can implement one or more embodiments of the present invention.

Turning now to FIG. 5, a computer system 500 is generally shown in accordance with an embodiment. The computer system 500 can be an electronic, computer framework comprising and/or employing any number and combination of computing devices and networks utilizing various communication technologies, as described herein. In one or more embodiments of the present invention, the computer system 500 can be a quantum computer. The computer system 500 can be easily scalable, extensible, and modular, with the ability to change to different services or reconfigure some features independently of others. The computer system 500 may be, for example, a server, desktop computer, laptop computer, tablet computer, or smartphone. In some examples, computer system 500 may be a cloud computing node.

The computer system 500 can include the random number generation system 100 that is depicted in FIG. 1. In one or more embodiments of the present invention, the random number generation system 100 is part of a hardware security module (HSM) 550 of the computer system 500. The HSM 550 can be a physical computing device that safeguards and manages digital keys for strong authentication and provides crypto processing. The HSM 550 can include one or more secure random number generation systems 100. In one or more embodiments of the present invention, the random number generation systems are cascaded with each other.

Computer system 500 may be described in the general context of computer system executable instructions, such as program modules, being executed by a computer system. Generally, program modules may include routines, programs, objects, components, logic, data structures, and so on that perform particular tasks or implement particular abstract data types. Computer system 500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system 500 has one or more central processing units (CPU(s)) 501a, 501b, 501c, etc. (collectively or generically referred to as processor(s) 501). The processors 501 can be a single-core processor, multi-core processor, computing cluster, or any number of other configurations. The processors 501, also referred to as processing circuits, are coupled via a system bus 502 to a system memory 503 and various other components. The system memory 503 can include a read only memory (ROM) 504 and a random access memory (RAM) 505. The ROM 504 is coupled to the system bus 502 and may include a basic input/output system (BIOS), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read only memory, flash memory, or any other suitable memory systems.

The computer system 500 comprises an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 may be stored in the mass storage 510. The mass storage 510 is an example of a tangible storage medium readable by the processors 501, where the software 511 is stored as instructions for execution by the processors 501 to cause the computer system 500 to operate, such as is described herein below with respect to the various Figures. Examples of computer program product and the execution of such instruction is discussed herein in more detail. The communications adapter 507 interconnects the system bus 502 with a network 512, which may be an outside network, enabling the computer system 500 to communicate with other such systems. In one embodiment, a portion of the system memory 503 and the mass storage 510 collectively store an operating system, which may be any appropriate operating system, such as the z/OS or AIX operating system from IBM Corporation, to coordinate the functions of the various components shown in FIG. 5.

Additional input/output devices are shown as connected to the system bus 502 via a display adapter 515 and an interface adapter 516 and. In one embodiment, the adapters 506, 507, 515, and 516 may be connected to one or more I/O buses that are connected to the system bus 502 via an intermediate bus bridge (not shown). A display 519 (e.g., a screen or a display monitor) is connected to the system bus 502 by a display adapter 515, which may include a graphics controller to improve the performance of graphics intensive applications and a video controller. A keyboard 521, a mouse 522, a speaker 523, etc. can be interconnected to the system bus 502 via the interface adapter 516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 500 includes processing capability in the form of the processors 501, and, storage capability including the system memory 503 and the mass storage 510, input means such as the keyboard 521 and the mouse 522, and output capability including the speaker 523 and the display 519.

In some embodiments, the communications adapter 507 can transmit data using any suitable interface or protocol, such as the internet small computer system interface, among others. The network 512 may be a cellular network, a radio network, a wide area network (WAN), a local area network (LAN), or the Internet, among others. An external computing device may connect to the computer system 500 through the network 512. In some examples, an external computing device may be an external webserver or a cloud computing node.

It is to be understood that the block diagram of FIG. 5 is not intended to indicate that the computer system 500 is to include all of the components shown in FIG. 5. Rather, the computer system 500 can include any appropriate fewer or additional components not illustrated in FIG. 5 (e.g., additional memory components, embedded controllers, modules, additional network interfaces, etc.). Further, the embodiments described herein with respect to computer system 500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for generating one or more random numbers, the method comprising:
   configuring, by a controller, a mapper to feed a plurality of inputs to a random number generation system using a subset of noise sources from a plurality of noise sources, wherein the random number generation system generates a random number based on the plurality of inputs, wherein the mapper comprises a look-up table that maps each of the subset of noise sources to a respective input of the random number generation system;

evaluating, by the controller, the subset of noise sources;

detecting, by the controller, that a first noise source from the subset of noise sources has degraded in quality, wherein the first noise source is mapped to a first input of the random number generation system;

evaluating, by the controller, a second noise source from the plurality of noise sources, the second noise source not being in the subset of noise sources;

in response to the second noise source satisfying at least a predetermined threshold criterion, replacing, by the controller, the first noise source with the second noise source in the subset of noise sources by updating the look-up table to map the second noise source to the first input of the random number generation system; and forwarding, by the mapper, outputs from each of the subset of noise sources to corresponding inputs of the random number generation system according to the look-up table, the outputs providing random bit streams to facilitate generating the random number by the random number generation system.

2. The computer-implemented method of claim 1, wherein the second noise source is from a second subset of noise sources that are in a suspended state.

3. The computer-implemented method of claim 2 further comprising, in response to the second subset of noise sources comprising less than a predetermined number of noise sources, notifying a user that the plurality of noise sources do not satisfy a predetermined quality threshold criterion for being used for random number generation.

4. The computer-implemented method of claim 2, further comprising, in response to the second subset of noise sources comprising less than a predetermined number of noise sources, suspending generating random numbers using the random number generation system.

5. The computer-implemented method of claim 2, further comprising, in response to the second subset of noise sources comprising less than a predetermined number of noise sources, causing the random number generation system to execute a post processing algorithm on the random number that is generated to satisfy a predetermined quality threshold of random number generation.

6. The computer-implemented method of claim 1, wherein replacing the first noise source comprises setting the first noise source in a suspended state.

7. A system for random number generation, the system comprising:

a multiplexer;

a memory device; and at least one processing unit coupled with the multiplexer and the memory device, the at least one processing unit is configured to perform a method comprising:

configuring a mapper to feed a plurality of inputs to a random number generation system using a subset of noise sources from a plurality of noise sources, wherein the random number generation system generates a random number based on the plurality of inputs wherein the mapper comprises a look-up table that maps each input of the random number generation system to a respective noise source from the subset of noise sources;

evaluating the subset of noise sources;

detecting that a first noise source from the subset of noise sources has degraded in quality, wherein a first input of the random number generation system is mapped to the first noise source;

evaluating a second noise source from the plurality of noise sources, the second noise source not being in the subset of noise sources;

in response to the second noise source satisfying at least a predetermined threshold criterion, replacing the first noise source with the second noise source in the subset of noise sources by updating the look-up table to map the first input of the random number generation system to the second noise source; and forwarding, by the mapper, outputs from each of the subset of noise sources to corresponding inputs of the random number generation system according to the look-up table, the outputs providing random bit streams to facilitate generating the random number by the random number generation system.

8. The system of claim 7, wherein the second noise source is from a second subset of noise sources that are in a suspended state.

9. The system of claim 8 wherein the method further comprises, in response to the second subset of noise sources comprising less than a predetermined number of noise sources, notifying a user that the plurality of noise sources do not satisfy a predetermined quality threshold criterion for being used for random number generation.

10. The system of claim 8, wherein the method further comprises, in response to the second subset of noise sources comprising less than a predetermined number of noise sources, suspending generating random numbers using the random number generation system.

11. The system of claim 8, wherein the method further comprises, in response to the second subset of noise sources comprising less than a predetermined number of noise sources, causing the random number generation system to execute a post processing algorithm on the random number that is generated to satisfy a predetermined quality threshold of random number generation.

12. The system of claim 7, wherein replacing the first noise source comprises setting the first noise source in a suspended state.

13. A computer program product for generating random numbers, the computer program product comprising a computer readable storage medium readable by one or more processing circuits, the computer readable storage medium storing instructions executable by the one or more processing circuits to cause a method to be performed, the method comprising:

configuring, by a controller, a mapper to feed a plurality of inputs to a random number generation system using a subset of noise sources from a plurality of noise sources, wherein the random number generation system generates a random number based on the plurality of inputs, wherein the mapper comprises a look-up table that maps each of the subset of noise sources to a respective input of the random number generation system;

evaluating the subset of noise sources;

detecting that a first noise source from the subset of noise sources has degraded in quality, wherein the first noise source is mapped to a first input of the random number generation system;

evaluating a second noise source from the plurality of noise sources, the second noise source not being in the subset of noise sources;

in response to the second noise source satisfying at least a predetermined threshold criterion, replacing the first noise source with the second noise source in the subset of noise sources by updating the look-up table to map the second noise source to the first input of the random number generation system; and forwarding, by the mapper, outputs from each of the subset of noise sources to corresponding inputs of the random number generation system according to the look-up table, the outputs providing random bit streams to facilitate generating the random number by the random number generation system.

14. The computer program product of claim 13, wherein the second noise source is from a second subset of noise sources that are in a suspended state.

15. The computer program product of claim 14, wherein the method further comprises, in response to the second subset of noise sources comprising less than a predetermined number of noise sources, notifying a user that the plurality of noise sources do not satisfy a predetermined quality threshold criterion for being used for random number generation.

16. The computer program product of claim 14, wherein the method further comprises, in response to the second subset of noise sources comprising less than a predetermined number of noise sources, suspending generating random numbers using the random number generation system.

17. The computer program product of claim 14, wherein the method further comprises, in response to the second subset of noise sources comprising less than a predetermined number of noise sources, causing the random number generation system to execute a post processing algorithm on the random number that is generated to satisfy a predetermined quality threshold of random number generation.

18. The computer program product of claim 13, wherein replacing the first noise source comprises setting the first noise source in a suspended state.

* * * * *